2,709,650
METHOD OF PROCESSING IRON CONTAINING MATERIALS TO NODULES

Friedrich Johannsen, Clausthal-Zellerfeld, Germany

No Drawing. Application May 21, 1951,
Serial No. 227,501

Claims priority, application Germany May 22, 1950

7 Claims. (Cl. 75—36)

The present invention relates to a method of processing iron containing materials in a rotary kiln while solid fuel is added thereto, and more particularly, to processing in such kilns to nodules, iron containing materials which additionally may also contain nickel, copper and precious metals.

With such methods, a reduction of the metal oxides to sponge metal is effected in the main zone of the kiln, whereas, in the last portion of the furnace, i. e., in the nodulizing zone, the formed sponge metal is at increased temperature and by a welding action, transformed into compact nodules. The process is carried out so that in the nodulising zone of the kiln, there is effected a direct contact of air or oxygen containing heating gases with the surface of the charge. While this occurs, a portion of the reduced metals oxidize and form with the charge, a semi-soft slag. Subsequently, in the interior of the charge of this zone, when the kiln revolves further, a renewed reduction of the formed metal oxides is effected by the still available solid fuel.

The difficulty in running this process consists in maintaining the balance between the oxygen content of the kiln gases, and the fuel available. If too much fuel is available, the oxidizing gases hitting the surface effect an oxidation of the fuel only which is amply available at said surface, whereas, an oxidation of the iron is suppressed and therefore a formation of slag cannot occur at the customary kiln temperatures. In addition thereto, there exists the danger that the sponge metal is too strongly enriched with carbon, so that liquid raw iron is formed, which impedes the processing of the slag and cannot fully be separated therefrom. If on the other hand, the fuel content is insufficient with regard to the introduced air, an excessive oxidation of the metals occurs at the charging surface, and the renewed reduction of these metal oxides in the interior of the charge remains incomplete in view of the high FeO content of the slag and in view of the rather low fuel content. As a result thereof it not only becomes difficult to obtain the metal, but the FeO rich slag becomes thinly liquid, attacks the kiln lining, and is not any more capable of carrying the nodules thereon, so that the latter settle at the bottom and form metallic deposits and incrustations in the furnace.

It is, therefore, an object of this invention to provide a method of processing iron containing materials which will overcome the above-mentioned drawbacks.

It is a still further object of this invention to provide a method of processing iron containing metals with or without additions of nickel, copper and precious metals, in a rotary kiln, while solid fuel is added thereto, which method will make it possible precisely to adjust the fuel content in the charge within the nodulising zone, to the continuously varying oxidation ratio.

These and other objects and advantages of the invention will become more apparent as the description proceeds.

In order to cause the processing of metal containing materials to nodules to proceed more evenly and in such a manner that it can be well controlled, according to the present invention, the fuel being added is so selected that its particles are of a small and possibly even particle size. Tests have proved that the particle size of the solid fuel to be added for the reducing process is decisive for the course which the process will take in the nodulising zone. With the customary finely grained fuels such as coke breeze, anthracite fine, etc., the material itself is partly rather fine, but partly also contains coarser particles having a particle size of from 8 to 15 millimeters. In these circumstances, it is unavoidable that at storage places and in coal bins, a rather extensive separation of the finer particles from the coarser particles occurs, so that the content of the respective charge varies within large limits as to coarser particles. It has been found that fuel particles of a size exceeding approximately 4 millimeters, can be exploited in the process only rather incompletely. These coarse fuel particles are therefore to a large extent encountered again in the discharge of the furnace and thus represent an additional and superfluous fuel consumption. To this loss there has to be added the fact that with a varying content in coarse particles, the quantity of fuel to be added during the operation has to be kept materially higher than the actual need in order to be sure that in spite of the presence of rather coarse particles, there will be available a sufficient quantity of finer particles needed for carrying out the process. However, when such excess quantity of fuel is used, the nodulising process at the presence of fine fuel particles, is unnecessarily made more difficult by impeding the oxidation of the iron at the surface of the charge. This in turn reduces the yield in nodules and results in the formation of small nodules only. The renewed reduction of the metal oxides in the interior of the charge is likewise unfavorably influenced by the use of only coarse fuel particles, since the coarse particles are less well distributed in the mixture and have a materially smaller active surface than a corresponding quantity of finely ground or crushed fuel particles.

On the other hand, it has been found that a generally very finely ground or crushed fuel of a particle size of less than 0.5 millimeter makes the oxidation process in the nodulising zone materially more difficult, since with such a fine distribution of the fuel, the surface will not contain any fuel-free parts where instead of a combustion of the fuel, an oxidation of the sponge metal can occur. The proportion of extremely fine fuel particles of a particle size of less than 0.5 millimeter relative to the total fuel quantity, must not exceed 30%, since this is approximately the maximum proportion which can be absorbed in the reducing zone and thus will practically not reach the nodulising zone. Therefore, according to the present invention, the fuel to be added in the process involved, should contain at least 70% of particles ranging from 0.5 to 4 millimeters in size in order to obtain the most favorable conditions for the nodulising zone. Such crushing, grinding or milling and classification of the fuel generally requires a drying of the fuel before it is reduced to the particle size involved. This drying and the subsequent preservation of the fuel at a maximum particle size of 4 millimeters may be disregarded only if the fuel price is extremely low, so that a limited loss in fuel caused by unconsumed coarse fuel particles found in the discharge is economically of no importance.

In many instances, it is advantageous precisely to adjust the fuel content of the charge in the nodulising zone to the continuously varying oxidation ratio. To this end, either the entire or a portion of the fuel required in the nodulising zone is blown into the kiln from the discharge end, for instance, together with the oxidizing air. In this connection, when blowing in the fuel, it may be advantageous to employ an even narrower classified fuel, i. e., a fuel having a particle size varying from 0.5 to 2 millimeters, whereas the fine fuel having a particle size of less than 0.5 millimeter, and the fuel having a coarser particle size of 2 to 4 millimeters, is admixed to the charge intended for carrying out the reducing process. When blowing in the fuel with oxidizing air, or with oxidizing heating gases, the fuel content of the individual kiln sections within the nodulising zone may be regulated individually by the selection of the particle size, by adjustment of the pressure, and by changing the blowing direction.

The direct introduction of a portion of the fuel, for instance, by blowing in the fuel, is particularly advantageous when cheap gas containing fuels such as hard coal, lignite or soft coal is used as solid reducing fuels. If the total quantity of the fuel of this type were added to the charge, the gaseous products in the reducing zone would be distilled off, and inasmuch as they would not find any free oxygen in this zone any more, they would leave the kiln unconsumed together with the discharge gases. If, on the other hand, a portion of the fuel is introduced directly into the nodulising zone, the distilled-off gases burn in this zone and directly contribute to the increase in temperature in this zone. A further advantage of this procedure consists in that the sulphur content of the subsequently added fuel enters to a materially less degree into the nodules than is the case when the total fuel is added to the charge, since the nodules at that time have been formed to a great extent and there is not sufficient time to allow a subsequent penetration of the nodules by the sulphur contained in the respective fuel portion.

It is, of course, understood that the present invention is by no means limited to the particular method described above, but also comprises any modifications within the scope of the appended claims.

What I claim is:

1. A method of processing iron containing materials which may also contain nickel, copper or precious metals to nodules in a rotary kiln having a reducing zone and a nodulising zone, which includes the steps of carrying out the reducing process by introducing into the reducing zone solid carbonaceous fuel having a particle size of 2 to 4 millimeters, and carrying out the nodulising process by introducing into the nodulising zone solid carbonaceous fuel having a particle size of not less than 0.5 millimeter and not more than 2 millimeters.

2. A method of processing to nodules in a rotary kiln materials containing iron in the form of iron oxides and which material may also contain nickel, copper or precious metals by reducing the iron oxides to iron and transforming the iron into nodules, the processing including the steps of maintaining an oxidizing atmosphere in the nodulizing zone, and of adding to the charge solid carbonaceous fuel having a particle size of not more than four millimeters.

3. A method of processing to nodules in a rotary kiln materials containing iron in the form of iron oxides and which material may also contain nickel, copper, or precious metals by reducing the iron oxides to iron and transforming the iron into nodules, the processing including the steps of maintaining an oxidizing atmosphere in the nodulizing zone, and of adding to the charge solid carbonaceous fuel having a particle size of not more than four millimeters, at least 70% of the total quantity of said fuel having a particle size of at least 0.5 millimeters.

4. A method of processing to nodules in a rotary kiln materials containing iron in the form of iron oxides and which material may also contain nickel, copper or precious metals by reducing the iron oxides to iron and transforming the iron into nodules, the processing including the step of adding to the charge solid carbonaceous fuel having a particle size of not more than four millimeters, the processing also including the step of introducing into the nodulising zone solid carbonaceous fuel having a particle size of from 0.5 to two millimeters from the discharge end of the said kiln.

5. A method of processing to nodules in a rotary kiln materials containing iron in the form of iron oxides and which material may also contain nickel, copper or precious metals by reducing the iron oxides to iron and transforming the iron into nodules, the processing including the step of adding to the charge solid carbonaceous fuel having a particle size of not more than four millimeters, the processing also including the step of introducing into the nodulising zone gas containing coal having a particle size of not less than 0.5 millimeter, and not greater than two millimeters by blowing the same under pressure into the kiln from the discharge end thereof.

6. A method of processing to nodules in a rotary kiln materials containing iron in the form of iron oxides and which may also contain nickel, copper or precious metals by reducing the iron oxides to iron and transforming the iron into nodules, the processing including the step of adding to the charge finely grained solid carbonaceous fuel, the processing also including the step of introducing into the nodulizing zone from the discharge end of the said kiln solid carbonaceous fuel having a particle size of from 0.5 to four millimeters.

7. A method of processing to nodules in a rotary kiln materials containing iron in the form of iron oxides and which may also contain nickel, copper or precious metals by reducing the iron oxides to iron and transforming the iron into nodules, the processing including the step of adding to the charge finely grained solid carbonaceous fuel, the processing also including the step of introducing into the nodulizing zone from the discharge end of the said kiln solid carbonaceous fuel having a particle size of from 0.5 to two millimeters.

References Cited in the file of this patent

UNITED STATES PATENTS

| Number | Name | Date |
|---|---|---|
| 949,387 | Weatherby | Feb. 15, 1910 |
| 1,964,917 | Johannsen | July 3, 1934 |
| 2,026,683 | Johannsen | Jan. 7, 1936 |
| 2,356,024 | Andersen et al. | Aug. 15, 1944 |
| 2,526,658 | Harmon et al. | Oct. 24, 1950 |
| 2,605,179 | Lindemuth | July 29, 1952 |
| 2,606,111 | Lindemuth | Aug. 5, 1952 |

OTHER REFERENCES

Treatise on Powder Metallurgy, vol. I, by Goetzel. Pages 84 and 85. Published, 1949, by Interscience Publishers, Inc., New York.